United States Patent
Jensen et al.

(10) Patent No.: US 6,247,687 B1
(45) Date of Patent: Jun. 19, 2001

(54) ELASTOMER DAMPER

(75) Inventors: William S. Jensen, Apex; Scott K. Miller, Willow Spring, both of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/277,886

(22) Filed: Mar. 29, 1999

(51) Int. Cl.$^7$ .............................. B60G 13/00; F16F 7/00
(52) U.S. Cl. .................. 267/200; 267/201; 188/381; 188/129
(58) Field of Search .................................. 267/196, 200, 267/201, 202, 203; 188/381, 271, 322.16, 322.17, 322.18, 129

(56) References Cited

U.S. PATENT DOCUMENTS

| | | | |
|---|---|---|---|
| 2,562,595 | 7/1951 | Blue | 267/1 |
| 2,683,015 | 7/1954 | Campbell | 248/358 |
| 2,955,795 | 10/1960 | Painter | 248/358 |
| 3,198,506 | 8/1965 | Thorn | 267/1 |
| 3,990,542 | 11/1976 | Dent et al. | 188/67 |
| 4,765,444 | 8/1988 | Bauer et al. | 188/129 |
| 4,925,165 * | 5/1990 | Sketo | 267/221 |
| 4,957,279 | 9/1990 | Thorn | 267/140.5 |
| 4,964,516 | 10/1990 | Thorn | 267/140.1 |
| 4,979,595 | 12/1990 | Paton | 188/129 |
| 5,174,551 * | 12/1992 | Mintgen | 267/201 |
| 5,183,137 | 2/1993 | Siwek et al. | 188/381 |
| 5,257,680 | 11/1993 | Corcoran et al. | 188/129 |
| 5,295,564 | 3/1994 | Stadelmann | 188/381 |
| 5,535,861 | 7/1996 | Young | 188/281 |
| 5,549,182 | 8/1996 | Ehrnsberger et al. | 188/129 |
| 5,595,268 * | 1/1997 | Paton | 188/271 |
| 5,613,580 | 3/1997 | Young | 188/300 |
| 5,634,537 | 6/1997 | Thorn | 188/300 |
| 5,720,369 | 2/1998 | Thorn | 188/300 |
| 6,053,291 * | 4/2000 | Shibahata et al. | 267/196 |

* cited by examiner

Primary Examiner—Douglas C. Butler
Assistant Examiner—Robert A. Siconolfi
(74) Attorney, Agent, or Firm—Michael M. Gnibus; Randall S. Wayland

(57) ABSTRACT

An elastomer damper (20) for damping movement between two relatively moveable members, such as shimmy motion between components in an aircraft landing gear assembly (10). The damper (20) includes a housing (24) having an internal cavity (36) with a cylindrical interior surface (34) and an opening (41), and a member assembly (28) moveable relative to the housing (24) having an elongated shaft (30) received through the opening (41) with a piston head assembly (32) mounted thereon. The piston head assembly (32) has a annular support element (46) received over the shaft (30) with a sleeve-like elastomer member (48) received over it. The elastomer member (48) engages the interior surface (34) in an interference fit relationship thereby radially precompressing the elastomer element (48) in the range of between about 5% and 15%. Low friction washers (50a, 50b) are preferably positioned adjacent to the ends of the elastomer ember (48) and the support member (46). Rigid washers (54a, 54b) may be provided to abut and support the low friction washers (50a, 50b). The elastomer member (48) preferably has grooves (51) forming a plurality of ribs (53) that are preferably axially oriented.

27 Claims, 10 Drawing Sheets

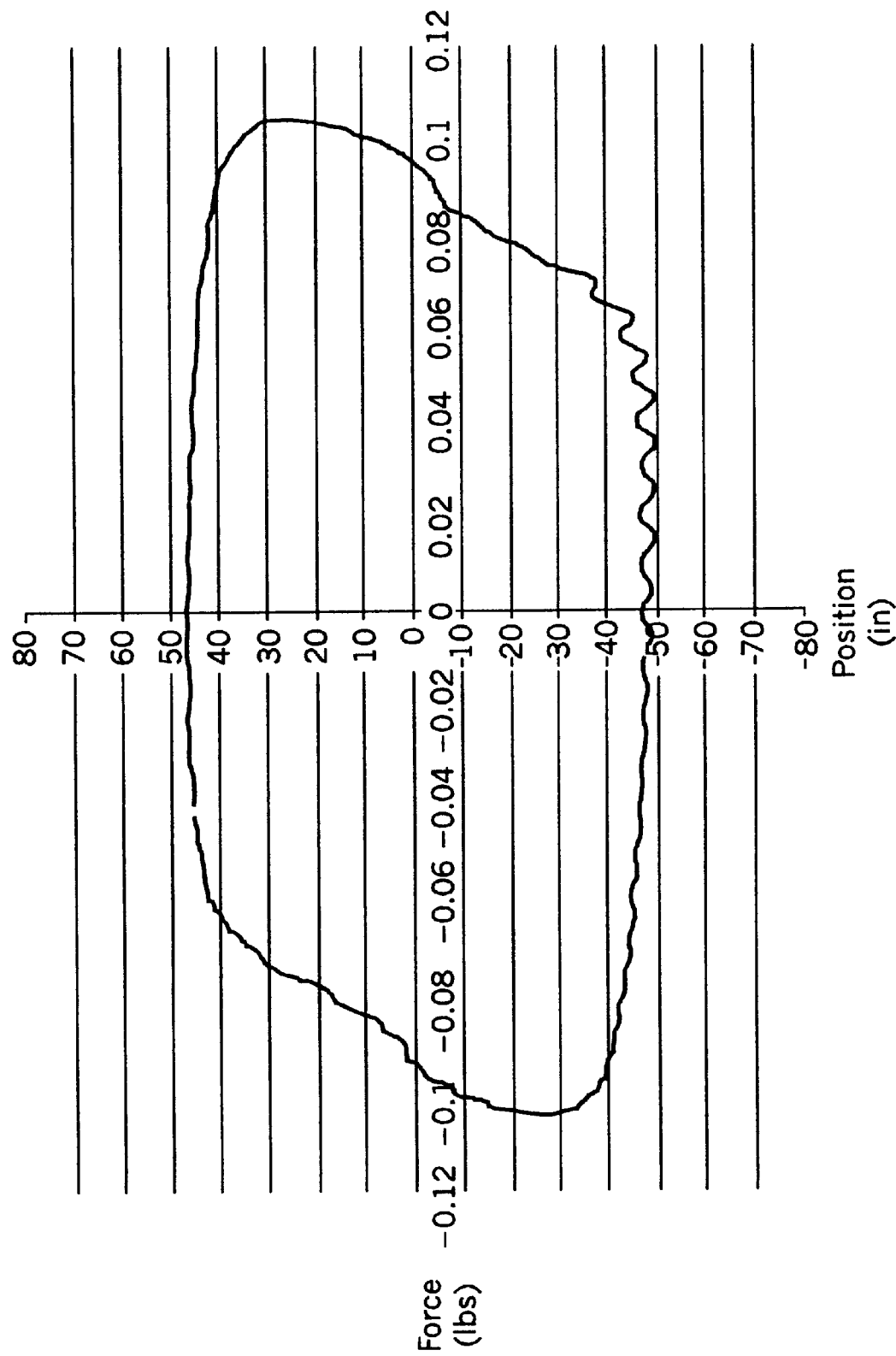

ELASTOMER DAMPER

FIELD OF THE INVENTION

The invention relates to the area of damping devices. Specifically, it relates to devices employing an elastomer element for generating damping forces.

BACKGROUND OF THE INVENTION

Dampers and shock-absorbers are known which use a hydraulic fluid as the working medium to create damping forces to control or minimize shock and/or vibration. Typically, the damping forces are generated by pressures resisting movement between operative components of the damper or shock absorber. For example, in aircraft landing gear applications, the current state of the art is to attach a fluid damper between components of the landing gear assembly to damp shimmy motions thereof. Although these fluid devices perform acceptably, they tend to be costly and are subject to leakage thereby constituting a maintenance issue for the aircraft.

Various devices are known which utilize elastomer elements to produce a damping or locking force. In essence, the elastomer element is in frictional engagement with another member and relative movement therebetween generates a quasi-frictional force or locking feature. Such devices are disclosed in U.S. Pat. No. 5,720,369 to Thorn entitled "Adjustable, Lockable Devices," U.S. Pat. No. 5,634,537 to Thorn entitled "Locking and Positioning Device," U.S. Pat. No. 5,613,580 to Young entitled "Adjustable, Lockable Strut", U.S. Pat. No. 5,535,861 to Young entitled "Dual-Rate Damper," U.S. Pat. No. 5,257,680 to Corcoran et al. entitled "Surface Effect Dampers Having Both A Hysteresis and A Frictional Component, U.S. Pat. No. 5,183,137 to Siwek et al. "Dual Rate Surface Effect Dampers" U.S. Pat. No. 4,964,516 to Thorn entitled "Damped Extended-Motion Strut," U.S. Pat. No. 4,957,279 to Thorn entitled "Fluidless Multi-Directional Motion-Damping Mount," and U.S. application Ser. No. 09/040,694 to Thorn et al. entitled "Resistance Generating Device" all of which are commonly assigned to the assignee of the present invention. Although these devices are adequate for their intended purposes, they each exhibit certain inadequacies which make them unattractive candidates for providing damping forces between relatively moveable members. In particular, many of the devices available heretofore provide damping forces that vary significantly with temperature variations.

Therefore, there is a long felt, and unmet, need for a simple, durable, maintenance free, and cost effective device for providing damping forces between relatively moveable members, and in particular, a damper which is substantially temperature insensitive.

SUMMARY OF THE INVENTION

The present invention provides a damper having an elastomer element that is simple in construction and cannot leak. Moreover, the invention provides a damper having an elastomer element that is simple in construction and exhibits temperature insensitive damping. The elastomer damper includes a housing and a member assembly moveable relative thereto which cooperate to produce damping force. The damper according to the invention finds excellent utility as a shimmy damper for aircraft landing gear.

In more detail, the elastomer damper comprises a housing including an internal cavity having a cylindrical interior surface of a first diameter, a first closed end, and a second end including an opening. The member assembly is moveable relative to the housing and includes an elongated shaft received through the opening and a piston head assembly mounted to the shaft. The piston head assembly is constructed of a support element received over the shaft, and an elastomer sleeve received over the support element; the elastomer sleeve having an outer diameter larger than the first diameter such that the elastomer sleeve engages the cylindrical interior surface in an interference fit relationship thereby radially precompressing the sleeve.

The housing preferably includes an end cap with a bearing and wiper seal which engages the shaft. Low friction washers are preferably received adjacent to ends of the sleeve and the support member and position and support same. Rigid washers preferably abut and support the low friction washers.

The elastomer element preferably comprises a sleeve-like member with a plurality of grooves therein forming a plurality of ribs. Preferably, the grooves are oriented axially. The ribs of the elastomer sleeve, upon assembly into the housing, are precompressed radially in the range of between about 5% and about 15%, and more preferably by about 8%. Preferably, the ribs exhibit a shape factor of between about 0.3 to about 1.2 that occurs when a width-to-height ratio of the ribs is between about 0.6 to about 2.4. This combination of shape factor and precompression provides excellent damping force stability over broad temperature ranges.

According to another aspect, the invention comprises an elastomeric damper having a housing including an internal cavity with a cylindrical interior surface of a first diameter, a first closed end, and a second end having an end cap including an opening and having a bearing mounted therein. A member assembly is axially moveable relative to the housing and includes an elongated shaft received through the opening and slidably engagable with the bearing, and a piston head assembly mounted to the shaft. The piston head assembly includes an annular support element received over the shaft, and an annular elastomer sleeve including axial grooves. The sleeve is received over the annular support element; the elastomer sleeve having an outer diameter larger than the first diameter such that the annular elastomer sleeve engages the cylindrical interior surface in an interference fit relationship. Preferably, the interference fit is such that it precompresses the annular elastomer sleeve by between about 5% and about 15% of a free height of the annular elastomer sleeve.

According to another aspect, the invention comprises elastomeric damper comprising a housing including an elongated internal cavity with a cylindrical interior surface of a first diameter, a first closed end, and a second end including an end cap having an opening formed therein. A member assembly is moveable relative to the housing and includes an elongated shaft slidably received through the opening, and a piston head assembly mounted to an end of the shaft. The piston head assembly includes an annular support element including a cylindrical outer surface received over the shaft, an annular elastomer sleeve including axial grooves forming a plurality of ribs; the sleeve being received over the cylindrical outer surface of the annular support element and wherein the elastomer sleeve has an outer diameter larger than the first diameter such that the annular elastomer sleeve engages the cylindrical interior surface in an interference fit relationship thereby precompressing the ribs by about between 5% and 15% of a free height of the annular elastomer sleeve. The invention preferably also includes low friction washers received adjacent to both ends of the sleeve and extending toward the cylindrical interior surface and stopping in relatively close proximity thereof.

It is an advantage of the present invention elastomer damper that it cannot leak.

Another advantage of the invention is that it provides a damper with durable construction.

Another advantage of the invention is providing excellent damping that is relatively unchangeable over broad temperature ranges.

Another advantage of the invention is providing damping for controlling shimmy in aircraft landing gear applications.

For the aircraft landing gear application, it is another advantage of the invention that it eliminates maintenance due to seal leakage.

The above-mentioned and further features, advantages and characteristics of the present invention will become apparent from the accompanying descriptions of the preferred embodiments and attached drawings.

BRIEF DESCRIPTION OF THE DRAWINGS

The accompanying drawings form a part of the specification and illustrate an embodiment of the present invention. The drawings and description together, serve to fully explain the invention. In the drawings.

FIG. 10 is a representative performance plot at room temperature and 15 Hz of the damper according to the present invention.

DETAILED DESCRIPTION OF THE PREFERRED EMBODIMENTS

Figure 1:
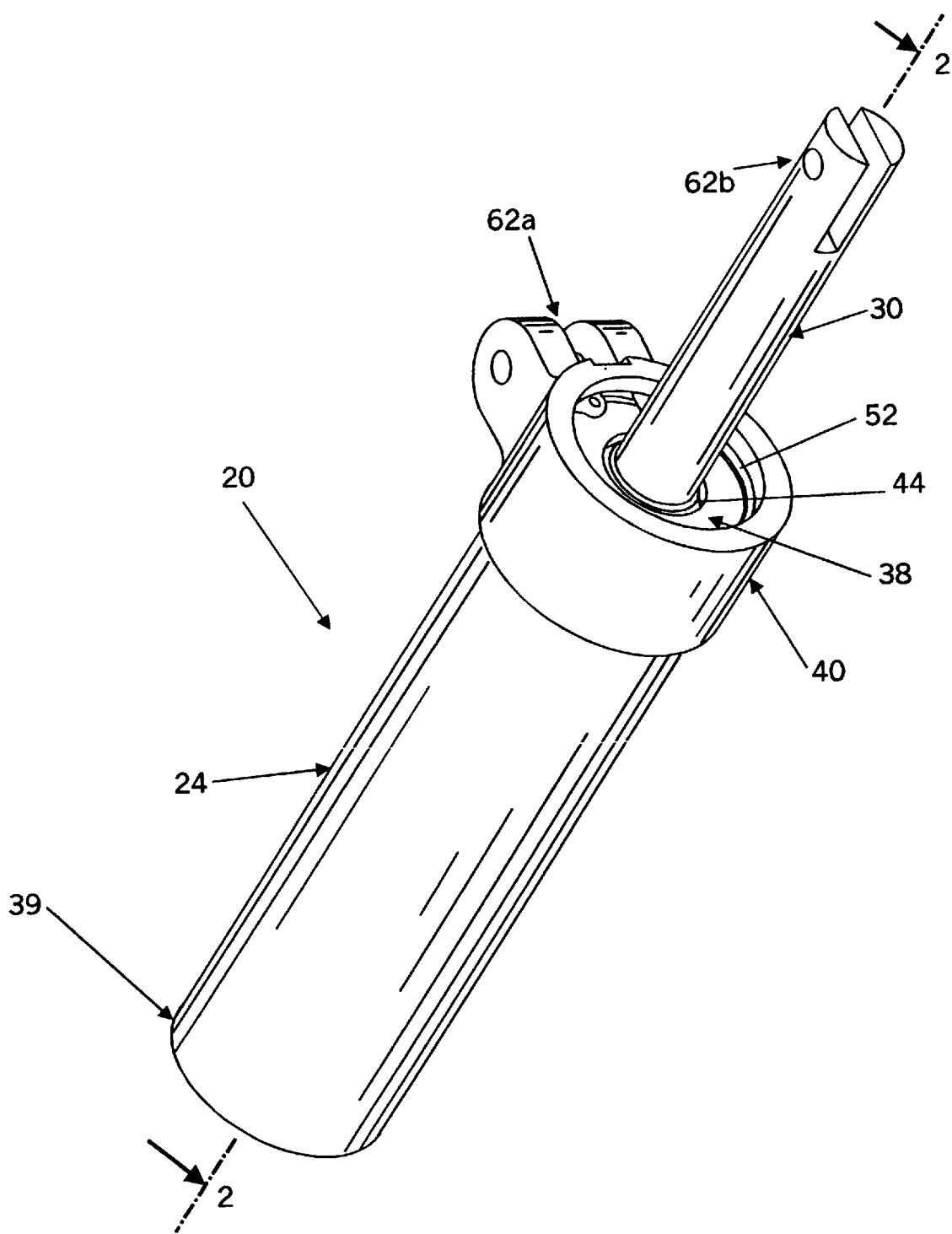
FIG. 1 is a perspective view of the elastomer damper in accordance with the present invention.
Figure 2:
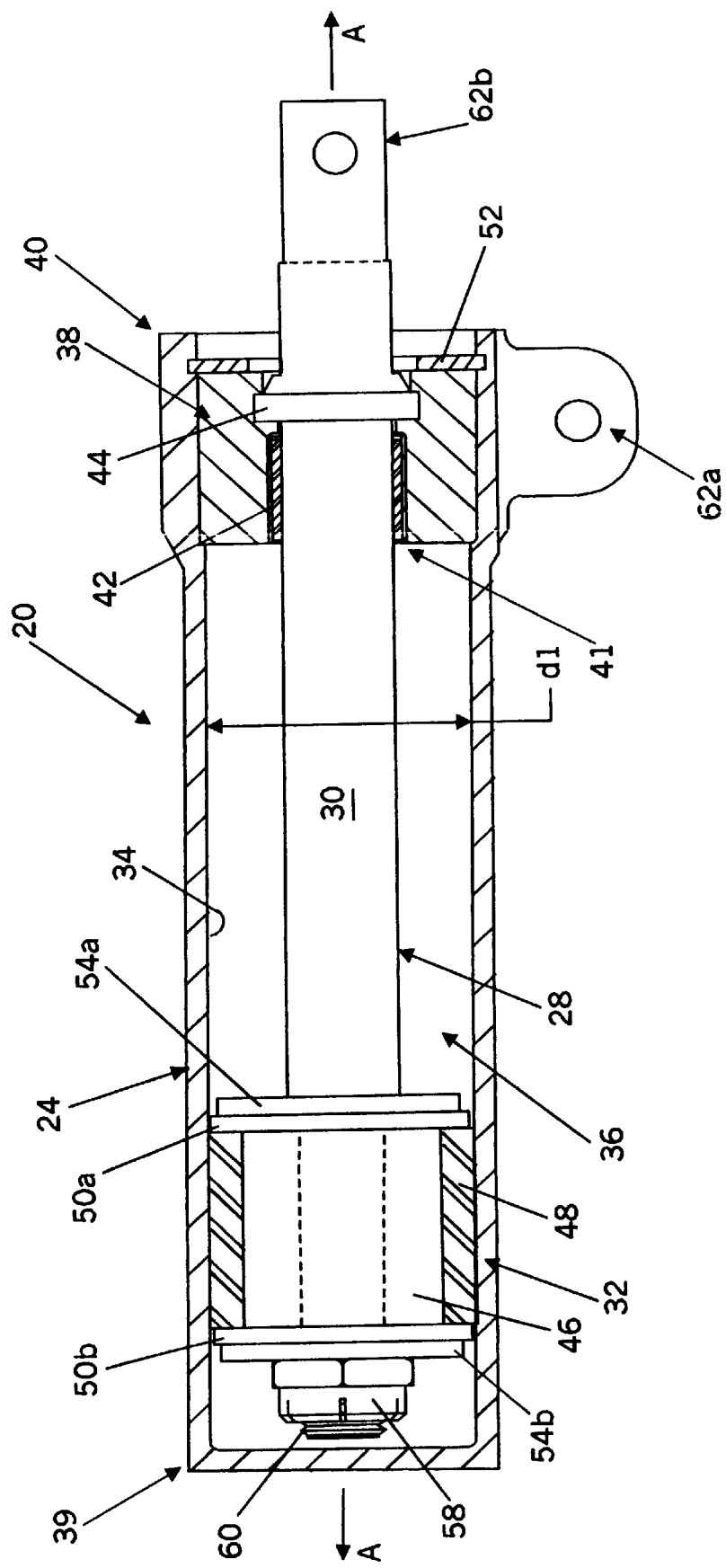
FIG. 2 is a cross sectional view of the elastomer damper taken along section line 2—2 of FIG. 1.
Figure 3:
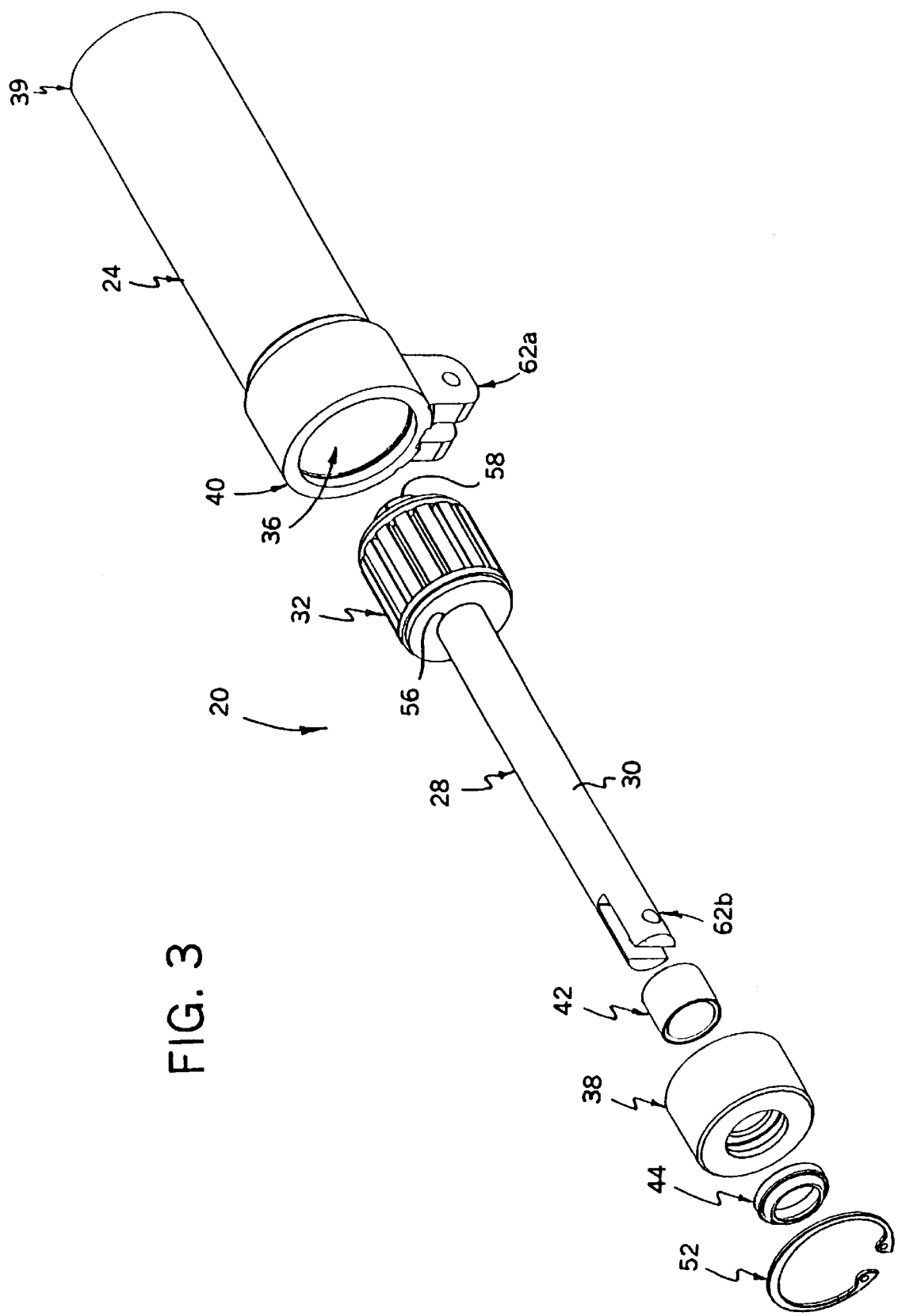
FIG. 3 is an exploded perspective view of the elastomer damper of FIG. 1.
Figure 6:
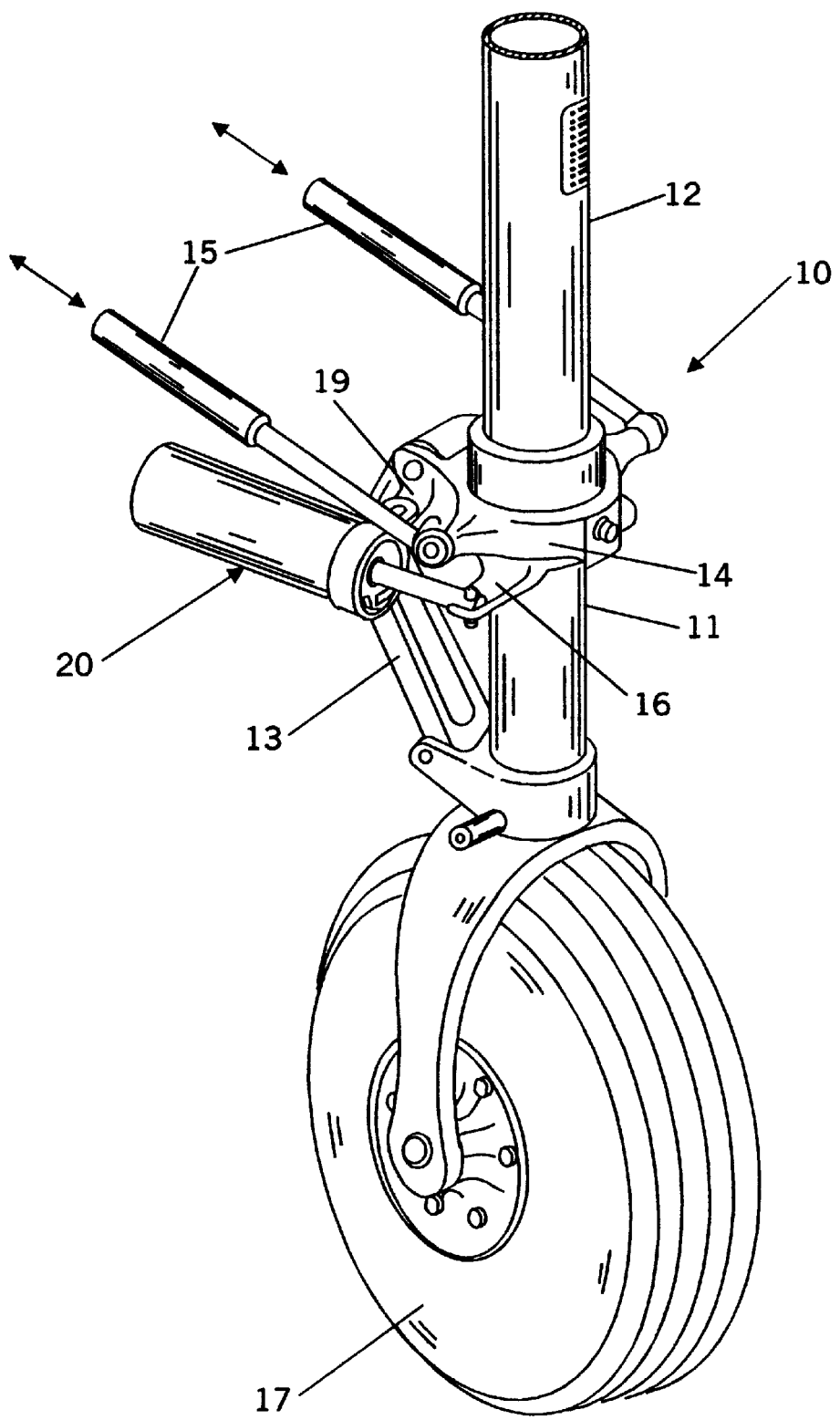
FIG. 6 is a perspective view of the elastomer damper according to the present invention installed in a landing gear assembly.

Referring now to the Drawings where like numerals denote like elements, in FIGS. 1–3, shown generally at 20, are various illustrations of the elastomer damper for providing a damping force between two relatively movable structures (See FIG. 6). The damper 20 includes a housing 24 and a member assembly 28 that is axially moveable (reciprocatable) relative thereto.

According to the invention, the preferably aluminum housing 24 includes a generally cylindrical internal cavity 36 having a smooth, elongated cylindrical interior surface 34 of a first diameter d1, a first closed end 39 and a second end 40 including a small diameter opening 41 formed therein. An aluminum end cap 38 of the housing 24 which includes the opening 41 is received in the second end and is retained in place by retention member 52, such as a c-clip or other suitable retaining means, such as adhesive, crimping, etc.

The member assembly 28 includes an elongated, rigid, preferably stainless steel shaft 30 received through the opening 41, and a piston head assembly 32 mounted to the axial end of shaft 30. The piston head assembly 32 further includes a support element 46, an elastomer element 48, two low friction washers 50a, 50b, and two rigid washers 54a, 54b.

Received over the end of the shaft 30 is the support element 46 that preferably comprises an annular sleeve of rigid material, such as aluminum, including a cylindrical outer surface 55.

The elastomer element 48 is preferably received over the support element 48 in a slight interference fit (approximately 5% smaller diameter) and unbonded relationship. Although the elastomer element 48 may optionally be bonded to the cylindrical outer surface 55 of the support element 46. The elastomer element 48 includes an assembled outer diameter d2 (when assembled over support element 46) which is larger than the first diameter d1 of the housing 24, such that the elastomer element 48 engages the cylindrical interior surface 34 in an interference fit relationship. Accordingly, this interference causes the elastomer element 48 to be precompressed enough to achieve the appropriate damping level as the elastomer element slidably engages the housing 24.

The low friction washers 50a, 50b are positioned to abut the axial ends of the elastomer element 48 and substantially eliminate any axial shearing movement such that it cannot shear relative to the cylindrical wall 34 where it would behave as a spring. This achieves the maximum damping force. The washers 50a, 50b also abut the axial end of the support member 46, thus the washers serve the additional purpose of axially locating and supporting the elastomer element 48 relative to the support member 46.

The length L1 of the elastomer element 48 in its free state is preferably slightly longer by approximately 0.03 inch (0.76 mm) than the length L2 of the support element 46. Moreover, the elastomer sleeve 48 preferably includes an inner diameter d3 that in its free state is slightly smaller that the outer diameter d4 of the support element 46, thereby allowing good engagement when assembled.

The washers 50a, 50b preferably have an outer diameter dimension which is slightly smaller that the cylinder diameter d1 of the housing 24. The washers 50a, 50b then serve the additional function of preventing any substantial side loading on the elastomer element 48 should a side load be encountered. This function is accomplished by the washer smoothly sliding against the housing wall 34. A low friction material is desired for the washers to prevent scratching the wall 34 upon contact therewith. Nylon or any other suitable low-friction material may be used for the washers 50a, 50b. Abutting and supporting the low friction washers 50a, 50b of piston head assembly 32 are two rigid (e.g., steel) washers which are preferably of a slightly smaller diameter.

The elongated shaft 30 of member assembly is received through the opening 41 in the end cap 38 and engages a bearing 42 and wiper/seal 44 mounted in end cap 38. The bearing 42 comprises a metal outer sleeve with a Nylon liner and serves as an alignment guide for the member assembly 28. A suitable bearing is available as Part No. 8N8D from Thomson Industries, Inc. of Washington, N.Y. A suitable wiper/seal 44 is available as part number 4615SHD500 from Parker Seal of Salt Lake City, Utah. The wiper seal 44 protects the cavity from contamination (debris and water) which may degrade the performance or durability of the damper 20. Optionally, an o-ring seal may be employed.

Figure 4:
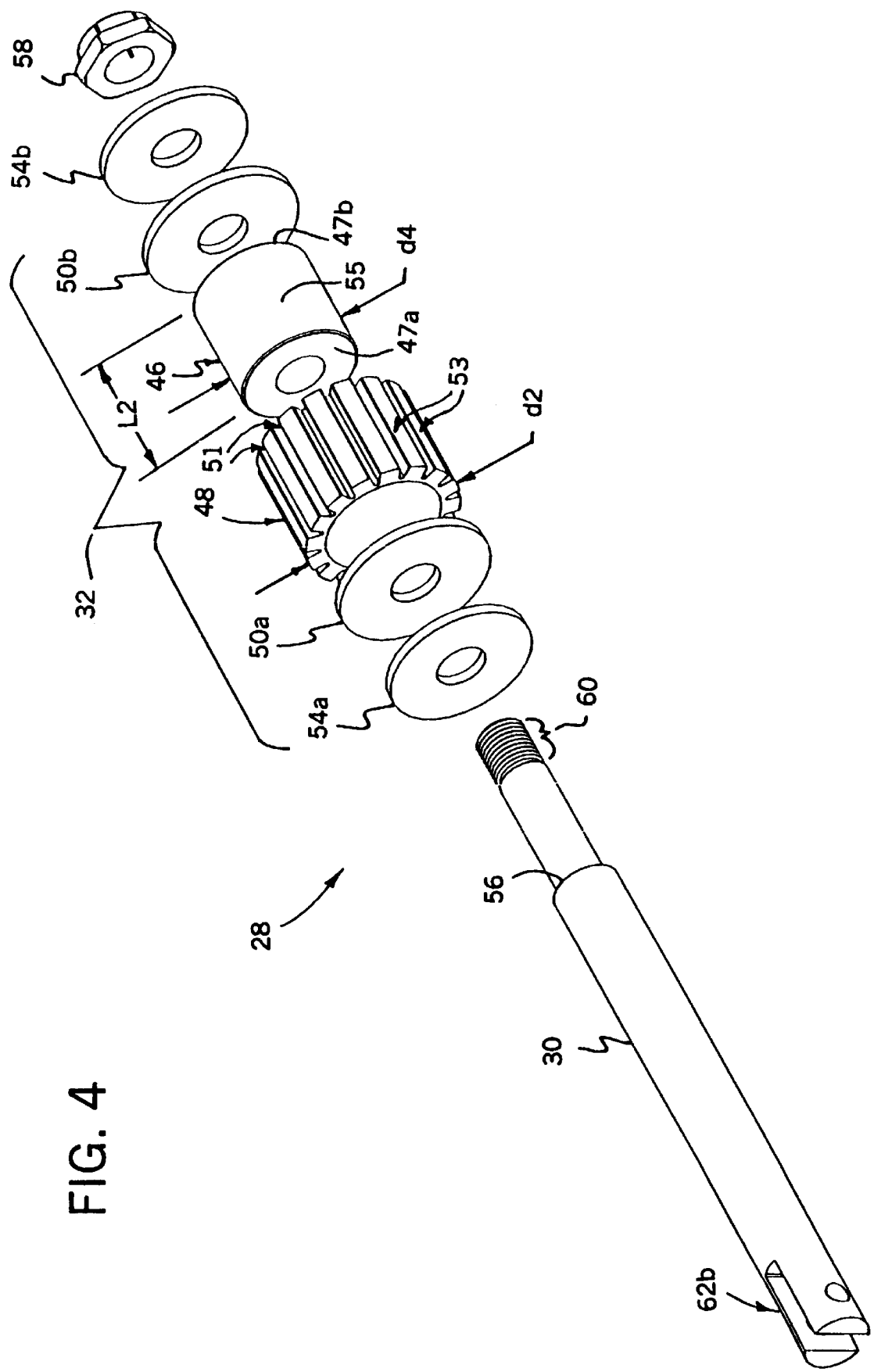
FIG. 4 is an exploded perspective view of the member assembly.

As best shown in FIGS. 3 and 4, the piston head assembly 32 of the member assembly 28 is held in place between a step 56 formed on the shaft 30 and a lock nut 58 threaded onto a threaded portion 60 of the shaft 30.

Figure 5:
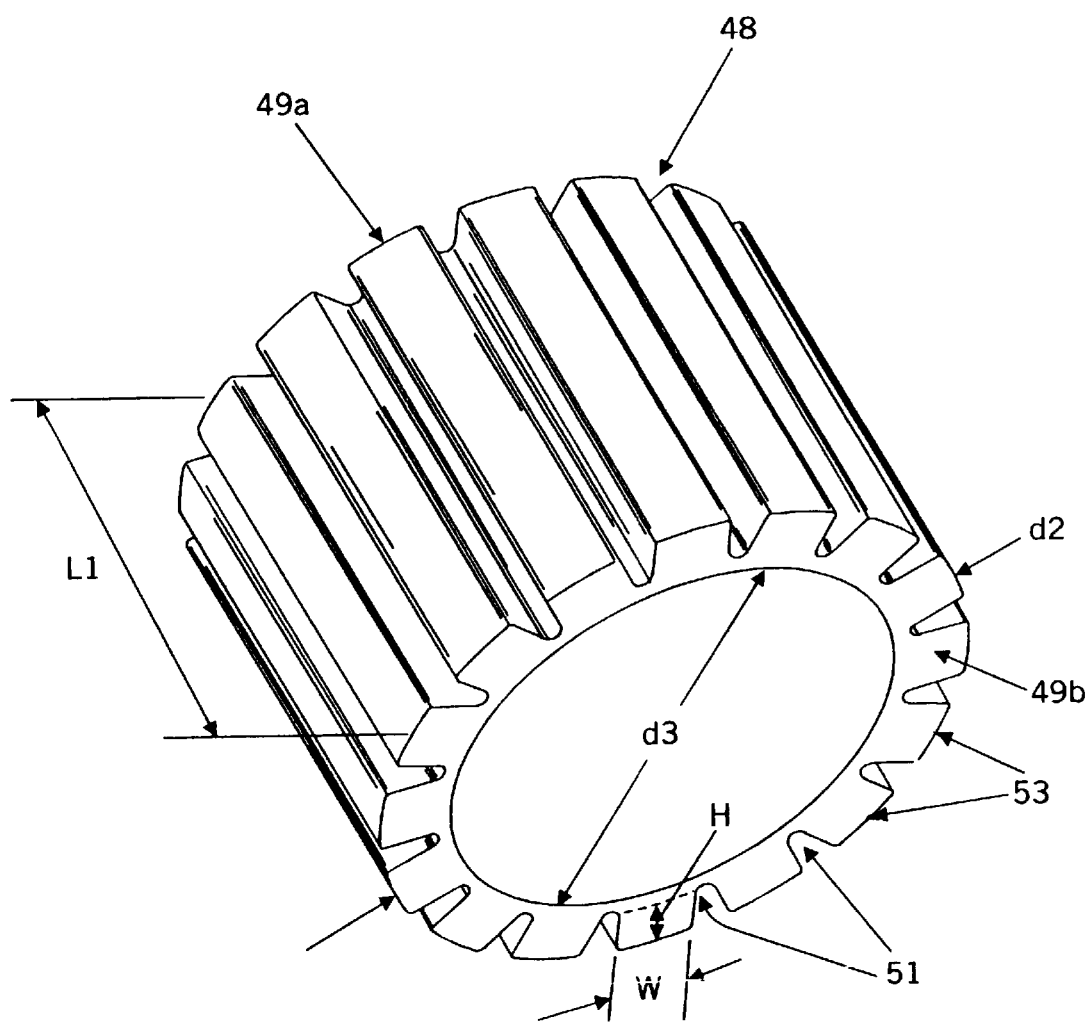
FIG. 5 is a perspective view of the elastomer element.

In FIGS. 4 and 5, the elastomer sleeve 48 is shown which has a plurality of grooves 51 formed thereon forming a plurality of ribs 53 (preferably 8–16 ribs). More or less ribs may be used if desired. Most preferably, the grooves 51 are oriented generally axially. The grooves may traverse radially into the sleeve the majority of the way through the thickness thereof. Optionally, the grooves 51 may also include a slight spiral form to help in redistribution of any lubricant used (see lubricant description below). The presence of ribs 53 allows the member 48 to be easily precompressed to the appropriate level. Upon assembly of the member assembly 28 into the housing 24, the elastomer sleeve 48 is precompressed radially in the range of between about 5% and about 15%, and more preferably by about 8%. This precompression allows the sleeve 48 to be in contact with the wall 34 (FIG. 2) for all temperatures within the designed operating range (approximately −30 F. to 150 F.) and provide acceptable damping levels. Preferably, the elastomer sleeve 48 includes ribs 53 thereon which exhibit a shape factor SF, defined as the load area divided by the bulge area, of between about 0.3 to about 1.2. This is approximately achieved when the ribs 53 formed on the elastomer sleeve 48 exhibit a width W-to-height H ratio of about 0.6 to about 2.4. This shape factor and the level of precompression synergistically achieves the outstanding damping force stability for the broad range of temperatures as is demonstrated by actual test curves shown in FIGS. 7–9. Suitable materials for the elastomer element 48 include Natural rubber, blends of Natural and Synthetic rubber, Butadiene-Styrene rubber, Nitrile, Butyl, Silicone, Neoprene, or any other suitable elastomeric material which is substantially incompressible and elastic. Most preferably, a natural rubber material of a shear modulus of about 115 psi (about 50 Shore A durometer) is found to exhibit the combination of good abrasion characteristics and low drift desired for long term stability. To enhance the smoothness of the damper, a lubricant is utilized on the interior surface 34 and the sleeve 48. The preferred lubricant for use with the preferred natural rubber is a silicone grease with a filler, such as Fluorocarbon Gel 880 available from NYE Lubricants. This type of lubricant is preferable because it stiffens by a desirable amount at low temperatures to offset the otherwise somewhat lower damping provided because of the slight shrinkage of the elastomer member 48 thereby providing excellent temperature stable damping.

FIG. 6 illustrates the elastomer damper 20 in accordance with the present invention installed in the environment of a landing gear assembly 10. The landing gear assembly 10 includes lower 11 and upper 12 strut tubes which reciprocate axially relative to one another providing suspension between the nose wheel 17 and the aircraft structure (not shown). As should be recognized, the aircraft structure is rigidly secured to the upper strut tube 12. A steering collar 14 is mounted on and surrounds the upper tube 12 and may freely rotate about the tube 12. A torque link assembly 13 consisting of two interdigitating links forms an interconnection which torsionally attaches the collar 14 to the lower tube 11 such that steering inputs into the collar 14 from the steering tubes rotate the lower tube 11 and the wheel 17 to steer the aircraft. Shimmy of the wheel 17 during takeoff, landing, and maneuvers is appropriately damped by the damper 20 which cooperates between the upper and lower tubes 11, 12. The damper 20 is preferably mounted between a bracket 16 rigidly connected to, and depending from, the upper tube 12, and a similar bracket 19 depending from the collar 14. A clevis 62a (FIG. 1) formed on the housing 24 is received over the bracket tang 19 extending laterally from the collar 14 and is pivotally secured to the tang 19 with a shoulder bolt or other suitable fastener thereby forming a pivot joint thereat. Likewise, a clevis member 62b formed by an end cut on the end of shaft 30 is received over the bracket 16 extending from the lower end of tube 12 and is fastened thereto by an appropriate fastener thereby also forming a pivot joint.

Figure 7:
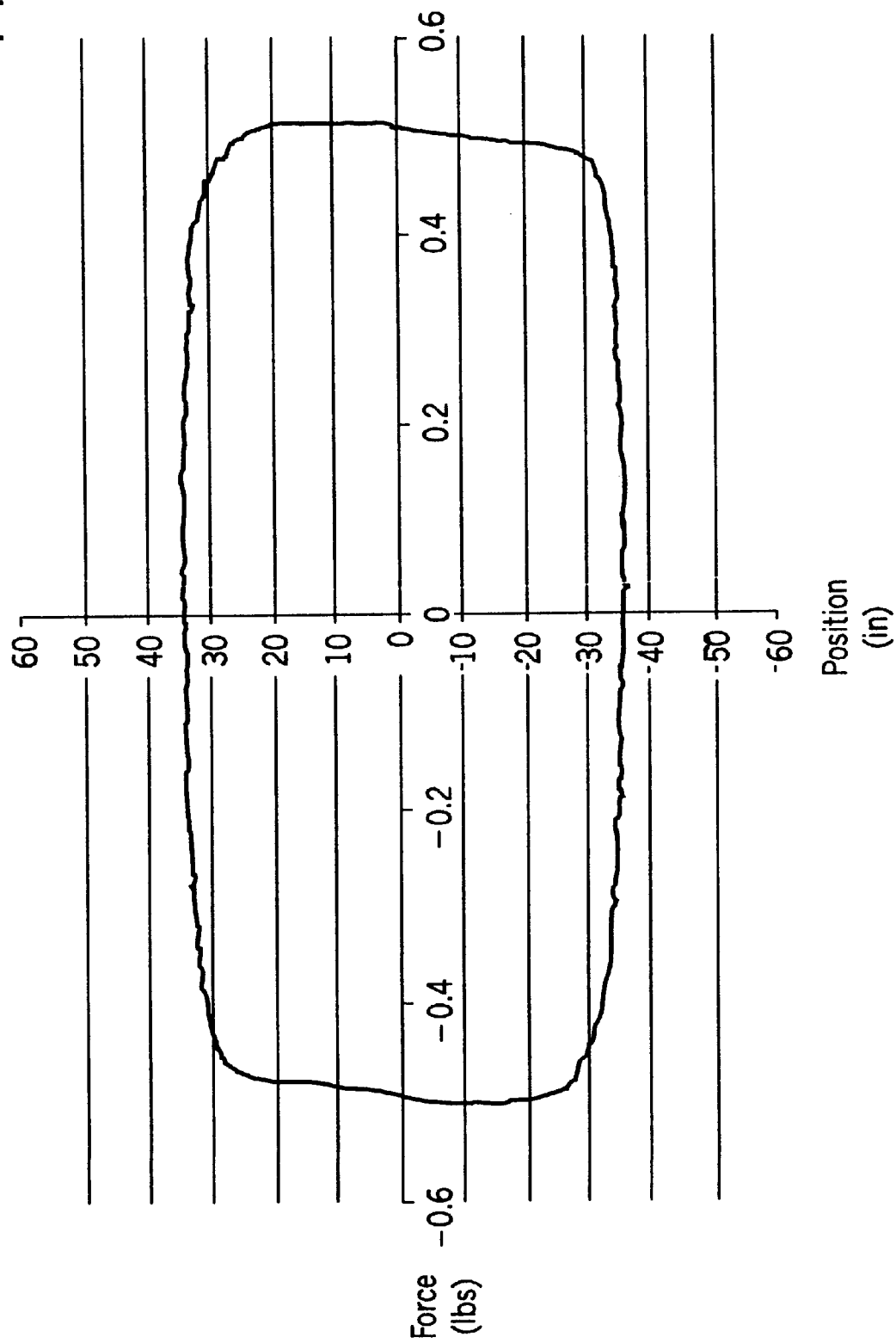
FIG. 7 is a representative performance plot at room temperature of the damper according to the present invention.

FIG. 7 illustrates a representative force versus position performance plot for the present invention elastomer damper 20. The plot is taken at room temperature, at 1 hz, and at +−0.5 inch (+−12.7 mm) which is representative of a dynamic input condition for the aircraft landing gear application during taxi, for example. As can be seen, for the representative damper, a damping value of about +−35 lb. (+−5450 N) is generated. More damping force may be generated by appropriate sizing and precompression of the elastomer element 48 utilized therein. As should be recognized, the damping force is also very linear along its axial excursion.

Figure 8:
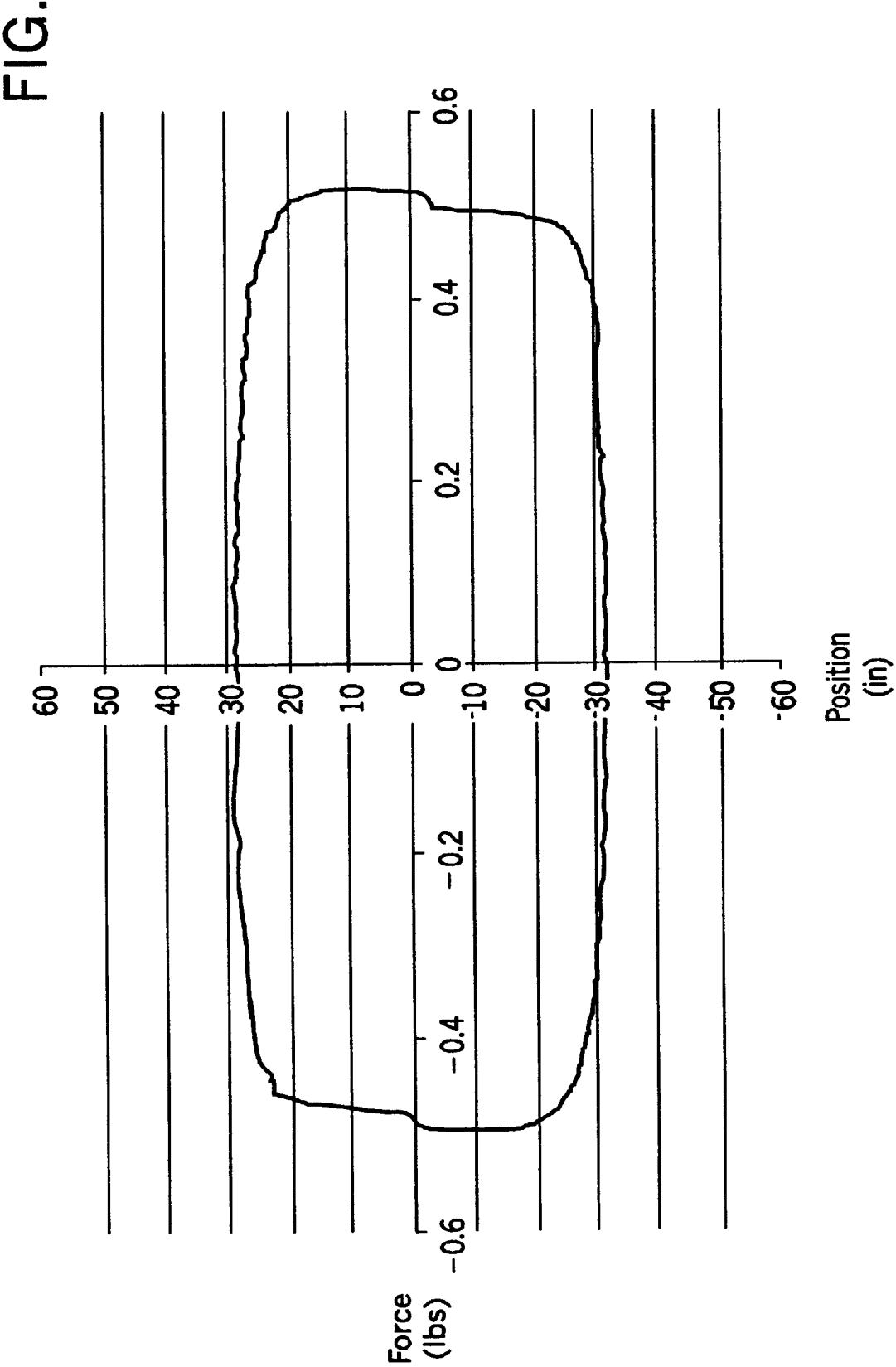
FIG. 8 is a representative performance plot at 150 degrees F. of the damper according to the present invention.
Figure 9:
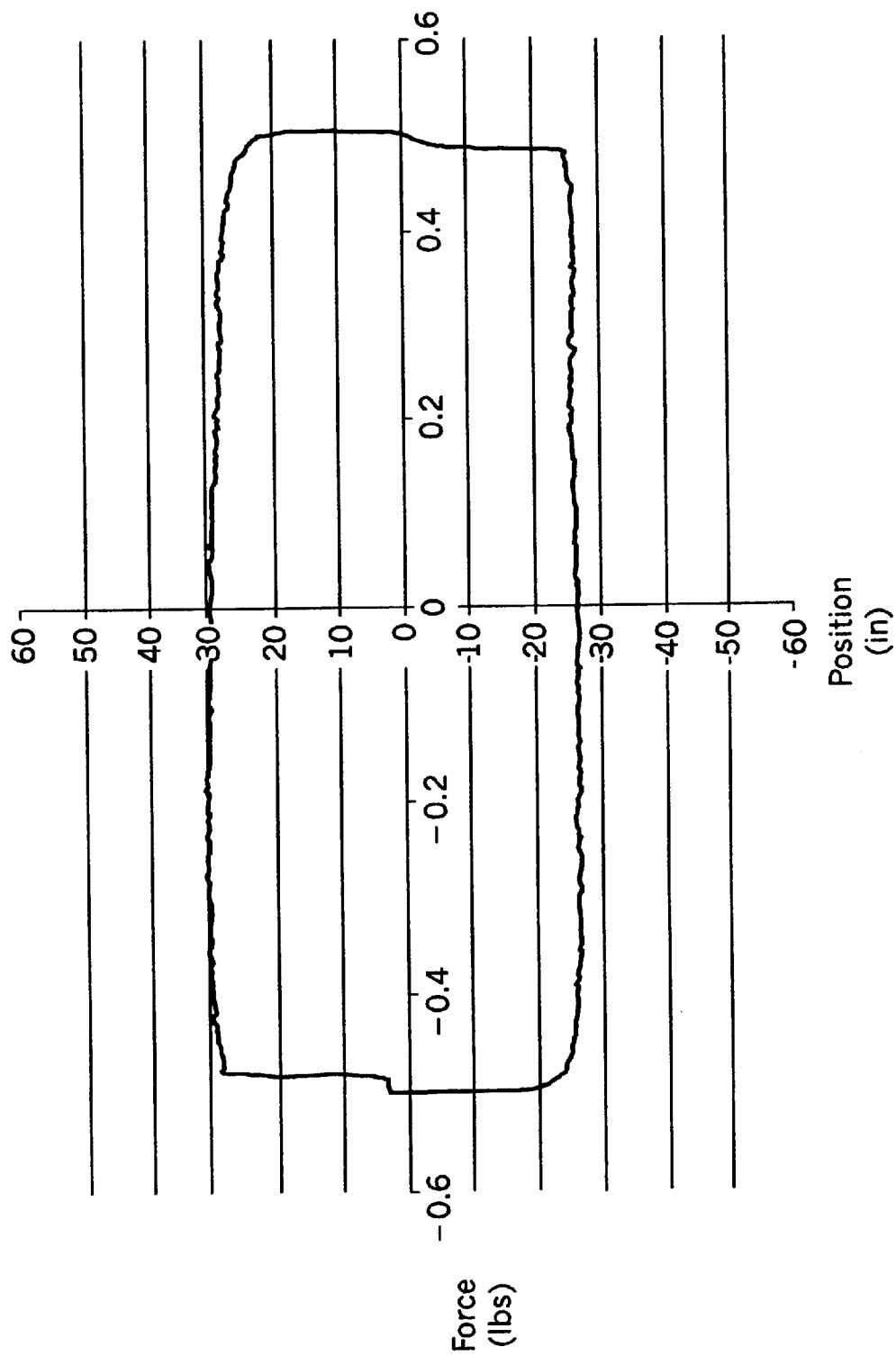
FIG. 9 is a representative performance plot at minus 30 degrees F. of the damper according to the present invention.

FIGS. 8 and 9 demonstrate similar performance plots at 1 hz and 0.5 inch (+−12.7 mm) and at high temperature (150 degrees F.) and low temperature (minus 30 degrees F.), respectively. It should be recognized that the damping values generated are remarkably consistent over the entire temperature range.

FIG. 10 demonstrates a performance plot at 15 hz and 0.1 inch (+−2.5 mm) and at room temperature (68 degrees F.) which is representative of a shimmy condition during takeoff, landing, etc. It should be recognized that the damping force desirably increases slightly with increased frequency.

In summary, it should be apparent from the foregoing that the present invention comprises a novel elastomer damper which includes a housing and a member assembly moveable relative thereto, where an elastomer element is received in interference fit relationship with the housing to generate temperature stable damping forces therebetween. The invention provides dampers and apparatus that are simpler, more robust, of equivalent performance, and less costly than prior devices.

While several embodiments including the preferred embodiment of the present invention have been described in detail, various modifications, alterations, changes, and adaptations to the aforementioned may be made without departing from the scope of the present invention defined in the appended claims. It is intended that all such modifications, alterations, and changes be considered part of the present invention.

What is claimed is:

1. An elastomer damper, comprising:
   (a) a housing including an internal cavity having a cylindrical interior surface of a first diameter, a first closed end, and a second end including an opening therein, and
   (b) a member assembly moveable relative to the housing, the member assembly including;
      an elongated shaft received through the opening, and
      a piston head assembly mounted to the shaft, the piston head assembly including;
         a support element received over the shaft, and
            a unitary elastomer sleeve received over the support element, the elastomer sleeve having a thickness, a first end, a second end, a plurality of grooves formed thereon, the grooves extending between the first and second ends and traversing the sleeve radially a majority of the way through the sleeve thickness, the sleeve further comprising a plurality of radially compressible ribs, each rib being defined by a pair of adjacent grooves, the sleeve further comprising an outer diameter larger than the first diameter such that the elastomer sleeve engages the cylindrical interior surface in an interference fit relationship radially precompressing the elastomer sleeve ribs, whereby the elastomer sleeve is axially slidable thereagainst to generate a damping force.

2. The elastomer damper of claim 1 wherein the housing further comprises an end cap including the opening.

3. The elastomer damper of claim 2 wherein the elongated shaft is received through the opening in the end cap.

4. The elastomer damper of claim 2 wherein the end cap is retained by a retaining clip.

5. The elastomer damper of claim 1 wherein the second end includes a bearing.

6. The elastomer damper of claim 1 wherein the second end includes a wiper seal.

7. The elastomer damper of claim 1 wherein the housing further comprises an end cap having a bearing and wiper seal mounted therein which engage the shaft.

8. The elastomer damper of claim 1 wherein at least one low friction washer is received adjacent to an end of the sleeve.

9. The elastomer damper of claim 8 wherein the at least one low friction washer comprises a first low friction washer abutting at a first end of the sleeve and a second low friction washer abutting a second end of the sleeve.

10. The elastomer damper of claim 8 wherein the piston head assembly further comprises at least one rigid washer abutting the at least one low friction washer.

11. The elastomer damper of claim 1 wherein at least one low friction washer engages an axial end of the support member.

12. The elastomer damper of claim 1 wherein the piston head assembly is held in place between a step formed on the shaft and a nut threaded onto a threaded portion of the shaft.

13. The elastomer damper of claim 1 wherein the grooves are substantially axially oriented.

14. The elastomer damper of claim 1 wherein a length of the elastomer sleeve in a free state is slightly larger that a length of the support element.

15. The elastomer damper of claim 1 wherein the elastomer sleeve is precompressed radially in the range of between about 5% and about 15%.

16. The elastomer damper of claim 15 wherein the elastomer sleeve is precompressed by about 8%.

17. The elastomer damper of claim 1 wherein the elastomer sleeve is precompressed by an appropriate amount such that the precompression is not completely relieved at any temperature within a design operating temperature range of the damper.

18. The elastomer damper of claim 1 wherein the support element comprises an annulus.

19. The elastomer damper of claim 1 wherein the elastomer sleeve includes an inner diameter which in a free state is slightly smaller than an outer diameter of the support element.

20. The elastomer damper of claim 1 wherein the ribs thereon exhibit a shape factor of between about 0.3 to about 1.2.

21. The elastomer damper of claim 1 wherein the ribs formed on the elastomer sleeve exhibit a width-to-height ratio of about 0.6 to about 2.4.

22. The elastomer damper of claim 1 wherein the elastomer sleeve is lubricated with a grease.

23. The elastomer damper of claim 1 wherein the grease comprises a silicone grease including a filler.

24. A landing gear assembly including the elastomer damper of claim 1 wherein the landing gear assembly includes first and second relatively moveable components and wherein the housing interconnects to the first component and the shaft interconnects to the second component such that the damper may provide damping therebetween.

25. An elastomer damper, comprising:
(a) a housing including an internal cavity having a cylindrical interior surface of a first diameter, a first closed end and a second end having an end cap including an opening having a bearing mounted therein,
(b) a member assembly moveable relative to the housing, the member assembly including;
an elongated shaft received through the opening and slidably engagable with the bearing, and
a piston head assembly mounted to the shaft, the piston head assembly including;
an annular support element received over the shaft, and
an annular unitary elastomer sleeve, sleeve having a radial thickness, a first end, a second end, a plurality of grooves formed thereon, the grooves extending between the first and second ends and traversing the sleeve radially a majority of the way through the sleeve thickness, the sleeve further comprising, a plurality of axially extending and radially compressible ribs each rib being defined by a pair of adjacent grooves, the elastomer sleeve being mounted to the shaft and having an outer surface received over the shaft, the elastomer sleeve having an outer diameter larger than the first diameter such that the annular elastomer sleeve engages the cylindrical interior surface in an interference fit relationship thereby radially precompressing the annular elastomer sleeve by between about 5% and about 15% of a free radial height of the annular elastomer sleeve, the annular elastomer sleeve axially slidable against the cylindrical interior surface to generate a damping force.

26. An elastomer damper, comprising:
(a) a housing including an elongated internal cavity having a cylindrical interior surface of a first diameter, a first closed end and a second end including an end cap having an opening formed therein,
(b) a member assembly moveable relative to the housing, the member assembly including;
an elongated shaft slidably received through the opening, and
a piston head assembly mounted to an end of the shaft, the piston head assembly including;
an annular support element including a cylindrical outer surface received over the shaft;
an annular unitary elastomer sleeve having a radial thickness, a first end, a second end, a plurality of grooves formed thereon, the grooves extending between the first and second ends and traversing the sleeve radially a majority of the way through the sleeve thickness, the sleeve further comprising, a plurality of axially extending and radially compressible ribs each rib being defined by a pair of adjacent grooves, the elastomer sleeve being mounted to the shaft and having an outer surface received over the shaft, the sleeve being received over the cylindrical outer surface of the annular support element, the elastomer sleeve having an outer diameter larger than the first diameter such that the annular elastomer sleeve engages the cylindrical interior surface in an interference fit relationship thereby radially precompressing the ribs by about between 5% and 15% of a free radial height of the annular elastomer sleeve; and low friction washers received adjacent to both ends of the sleeve and extending toward the cylindrical interior surface and stopping in relatively close proximity thereof wherein the annular elastomer sleeve axially slidable against the cylindrical interior surface to generate a damping force.

27. An elastomer damper, comprising:

(a) a housing including a cavity having an interior surface of a first diameter, (b) a member assembly moveable relative to the housing, the member assembly including;

a shaft, and a unitary elastomer member including a radial thickness, a first end, a second end, a plurality of grooves formed thereon, the grooves extending between the first and second ends and traversing the sleeve radially a majority of the way through the sleeve thickness, the sleeve further comprising, the elastomer member further comprising a plurality of axially extending and radially compressible ribs each rib being defined by a pair of adjacent grooves, the elastomer member being mounted to the shaft and having an outer diameter larger than the first diameter such that the elastomer member engages the cylindrical interior surface in an interference fit relationship whereby the ribs are radially compressed, and wherein the axial ribs include a width-to-height ratio of between about 0.6 to 2.4, the elastomer member being axially slidable against the cylindrical interior surface to generate a damping force.

* * * * *